United States Patent
Pon (10) Patent No.: US 8,849,304 B2
(45) Date of Patent: Sep. 30, 2014

(54) PROVIDING LOCATION ASSISTANCE INFORMATION USING DATA FROM SMART METERS

(75) Inventor: Rayman Wai Pon, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/598,336

(22) Filed: Aug. 29, 2012

(65) Prior Publication Data

US 2014/0066087 A1 Mar. 6, 2014

(51) Int. Cl.
| H04W 88/02 | (2009.01) |
| H04L 29/12 | (2006.01) |
| H04W 4/04 | (2009.01) |
| G01D 4/00 | (2006.01) |
| G01C 21/20 | (2006.01) |

(52) U.S. Cl.
CPC ........... *H04W 4/04* (2013.01); *H04L 29/12783* (2013.01); *G01D 4/00* (2013.01); *G01C 21/206* (2013.01)
USPC ...................................................... 455/456.1

(58) Field of Classification Search
USPC .......... 455/456.1–456.3; 340/870.02, 870.07; 700/292; 701/431; 705/22, 34; 715/771; 709/223
See application file for complete search history.

(56) References Cited

U.S. PATENT DOCUMENTS

| 2007/0263641 | A1 | 11/2007 | Yee | |
| 2011/0029655 | A1* | 2/2011 | Forbes et al. | 709/223 |
| 2011/0061014 | A1* | 3/2011 | Frader-Thompson et al. | 715/771 |
| 2011/0063126 | A1* | 3/2011 | Kennedy et al. | 340/870.02 |
| 2011/0143772 | A1 | 6/2011 | Sridhara et al. | |
| 2012/0051242 | A1 | 3/2012 | Rigomier et al. | |

FOREIGN PATENT DOCUMENTS

| EP | 2116863 A1 | 11/2009 |
| WO | WO2011073830 A1 | 6/2011 |
| WO | WO2011073965 A1 | 6/2011 |
| WO | WO2011085051 A2 | 7/2011 |
| WO | WO2011124941 A1 | 10/2011 |

OTHER PUBLICATIONS

International Search Report and Written Opinion —PCT/US2013/056955—ISA/EPO—Nov. 2, 2014.

* cited by examiner

*Primary Examiner* — David Mizrahi
(74) *Attorney, Agent, or Firm* — Kilpatrick Townsend & Stockton LLP (57) ABSTRACT

Methods, systems, computer-readable media, and apparatuses for providing location assistance information using data from smart meters are presented. in some embodiments, a smart meter configured to measure service usage at a premises may transmit at least one data message to at least one wireless access point located at the premises, and the at least one data message may include information identifying a location of the smart meter. In addition, the at least one data message may be configured to cause the at least one wireless access point to provide, to at least one mobile device connected to the at least one wireless access point, the location of the smart meter as an estimated position of the at least one wireless access point.

23 Claims, 5 Drawing Sheets

PROVIDING LOCATION ASSISTANCE INFORMATION USING DATA FROM SMART METERS

BACKGROUND

Aspects of the disclosure relate to computing technologies, including computer software and computer hardware. In particular, various aspects of the disclosure relate to providing location assistance information using data from smart meters.

Personal computing devices, such as mobile phones, tablet computers, laptop computers, and desktop computers, are becoming increasingly popular. Many people now frequently operate one or more of these computing devices in their home or office, among other places, on a daily basis.

In addition, a number of software applications, websites, and other functionalities that can be provided on a computing device are beginning to use position information to further enhance a user's experience when using such a device. For example, a device may access a particular website, such as a restaurant review website, and the website may use information about the device's current location in order to provide location-specific content, such as reviews of nearby restaurants, to the device. Other applications and websites may, for instance, use information about a device's current location to display relevant maps to a user, provide the user with information about local businesses, or inform the user of a local weather forecast.

In some instances, however, a device might not know its current location, and/or might lack the hardware, software, reference information, and/or resources to determine its location on its own.

BRIEF SUMMARY

Certain embodiments are described that relate to providing location assistance information to computing devices using data from smart meters.

At a typical house, building, or other premises, a number of utility meters may be used to measure the extent to which various resources are consumed at the premises. For example, one or more utility meters may measure the amount of electric power consumed at the premises, the amount of water consumed at the premises, the amount of gas consumed at the premises, and/or the like. Often, these utility meters are analog devices that include various types of analog metering components that are configured to measure consumption of a particular resource. Increasingly, however, utility companies are replacing traditional, analog metering devices with so-called "smart meters."

Like their traditionally analog counterparts, smart meters may measure the usage of one or more services provided by a utility company. For example, a smart meter can measure the amount of electric power consumed at a particular premises, thus enabling the electric power utility company that provides power to the premises to bill the occupant(s) of the premises for the consumed power. Unlike analog utility meters, however, smart meters may include electronic circuitry, such as one or more wireless transceivers, that allow these smart meters to electronically report usage measurements back to their respective utility company, thus avoiding the need for a person to visit the premises and manually read the meter.

Notably, a smart meter may be deployed at a known location (e.g., at a particular house, building, or other relatively fixed service address) in order to measure service usage at that location. According to one or more aspects of the disclosure, the known location of a smart meter may be used to assist one or more other computing devices in the vicinity of the smart meter in determining their own location. In particular, in one or more arrangements, the known location of a smart meter may be shared with a local access point, so as to enable the access point to provide accurate location information to one or more connected devices.

In some embodiments, a smart meter configured to measure service usage at a premises may transmit at least one data message to at least one wireless access point located at the premises, and the at least one data message may include information identifying a location of the smart meter. In addition, the at least one data message may be configured to cause the at least one wireless access point to provide, to at least one mobile device connected to the at least one wireless access point, the location of the smart meter as an estimated position of the at least one wireless access point.

In one or more arrangements, the information identifying the location of the smart meter may include an address of the premises, an account number associated with the measured service usage, and/or geographic coordinates of the premises. In some arrangements, the at least one data message may further include an error factor specifying an amount of position error based on a size of the premises.

In at least one arrangement, the smart meter may retransmit the at least one data message based on a predefined schedule. In at least one additional arrangement, the at least one data message may be transmitted separately from metering information specifying the measured service usage.

In some embodiments, a wireless access point located at a premises may receive at least one data message from a smart meter configured to measure service usage at the premises, and the data message may include information identifying a location of the smart meter. Subsequently, the wireless access point may determine an estimated location of the wireless access point based on the location of the smart meter. Thereafter, the wireless access point may provide the estimated location of the wireless access point to one or more mobile devices connected to the wireless access point.

In one or more arrangements, the wireless access point may further receive, from the smart meter, metering information specifying the measured service usage, where the metering information is received separately from the at least one data message. Subsequently, the wireless access point may route the metering information to at least one monitoring entity.

BRIEF DESCRIPTION OF THE DRAWINGS

Aspects of the disclosure are illustrated by way of example. In the accompanying figures, like reference numbers indicate similar elements, and.

DETAILED DESCRIPTION

Certain embodiments are described that relate to providing location assistance information using data from smart meters. In some embodiments, a smart meter may share information about its location, which may be relatively fixed, with an access point. The access point may be located at a premises, such as a house or building, at which the smart meter is also located. In addition, based on the information received from the smart meter, the access point may be able to assist one or more devices connected to the access point in determining their location. In particular, the access point may be configured to notify the one or more connected devices that they are located at the same location as the smart meter and the access point.

In some embodiments, the location assistance information sent by the smart meter to the access point may include one or more particular data messages, referred to as location assistance messages, that are configured to cause the access point to pass along location assistance information to the one or more connected devices. Additionally, these location assistance messages may include specific information about the relatively fixed location of the smart meter. For example, one or more of these location assistance messages may include information specifying an address of the premises at which the smart meter is measuring service usage, an account number to which the service usage is being billed, geographic coordinates specifying the position of the smart meter, a device identifier assigned to the smart meter, and/or one or more error codes specifying an amount of error included in the location assistance information. Using any and/or all of this information from the smart meter, an access point, and in turn, a computing device connected to the access point, may be able to determine and/or estimate its location.

As used herein, an "access point" may refer to any device capable of and/or configured to route, connect, share, and/or otherwise provide a network connection to one or more other devices. An access point may include one or more wired and/or wireless interfaces, such as one or more Ethernet interfaces and/or one or more IEEE 802.11 interfaces, respectively, via which such a connection may be provided. For example, an access point, such as a wireless router, may include one or more Ethernet ports to connect to a local modem or other network components (e.g., switches, gateways, etc.) and/or to connect to one or more other devices to which network access is to be provided, as well as one or more antennas and/or wireless networking cards to broadcast, transmit, and/or otherwise provide one or more wireless signals to facilitate connectivity with one or more other devices.

Various embodiments will now be discussed in greater detail with reference to the accompanying figures, beginning with FIG. 1.

Figure 1:
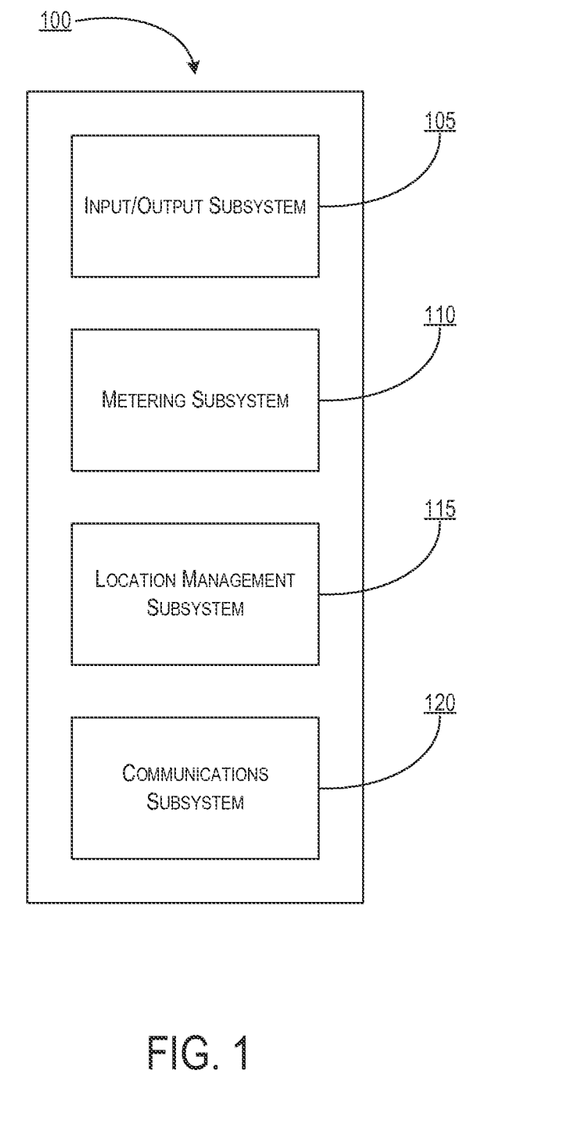
FIG. 1 illustrates a simplified diagram of a system that may incorporate one or more embodiments.

FIG. 1 illustrates a simplified diagram of a system 100 that may incorporate one or more embodiments. In the embodiment illustrated in FIG. 1, system 100 includes multiple subsystems, including an input/output subsystem 105, a metering subsystem 110, a location management subsystem 115, and a communications subsystem 120. One or more communication paths may be provided that enable the one or more subsystems to communicate with and exchange data with each other. In addition, the various subsystems illustrated in FIG. 1 may be implemented in software, hardware, or combinations thereof.

In some instances, system 100 may include other subsystems than those shown in FIG. 1. Additionally, the embodiment shown in FIG. 1 is only one example of a system that may incorporate some embodiments, and in other embodiments, system 100 may have more or fewer subsystems than those illustrated in FIG. 1, may combine two or more subsystems, or may have a different configuration or arrangement of subsystems.

In some embodiments, system 100 may be incorporated into a smart meter. For example, in some embodiments, input/output subsystem 105 may provide one or more interfaces that enable input to be received from, and/or output to be provided to, a user of system 100. For instance, input/output subsystem 105 may include one or more input devices, such as one or more buttons or keys, a mouse, a cursor, a trackball, a microphone, one or more ports (e.g., a serial port), and/or other input devices. Additionally, input/output subsystem 105 may include one or more output devices, such as one or more display screens, one or more audio speakers, and/or other output devices.

In one or more arrangements, input/output subsystem 105 may allow for system 100 to be initially configured and programmed with its location information. For example, using one or more input devices and/or one or more output devices of input/output subsystem 105, a user, such as an employee of a utility company, may configure system 100 to store information about the location at which system 100 is deployed. Such information may be stored by location management subsystem 115, as discussed in greater detail below. Additionally or alternatively, in some arrangements, system 100 may be configured remotely, for instance, via one or more wired and/or wireless communication interfaces included in communications subsystem 120, as discussed below. In addition, the user may, for example, configure system 100 to measure the amount of consumption of one or more resources, and report these measurements back to a central server. As discussed below, these measurements may be obtained via metering subsystem 110.

In particular, in some embodiments, metering subsystem 110 may enable system 100 to measure usage of one or more consumable utility services. For example, metering subsystem 110 may include one or more sensors, gauges, and/or other measurement devices that allow for various types of measurements. For instance, metering subsystem 110 may allow system 100 to measure an amount of electric power consumed (e.g., in kilowatt-hours) at a premises at which system 100 is located, an amount of water consumed at the premises at which system 100 is located, and/or an amount of gas consumed at the premises at which system 100 is located. In addition, metering subsystem 110 may store this usage information to facilitate reporting of the usage information to a central server, as discussed above.

In some embodiments, location management subsystem 115 may enable system 100 to determine and/or store information about a current location of system 100. For example, location management subsystem 115 may include one or more location determination components (e.g., a Global Positioning System (GPS) receiver) that enable system 100 to determine its current location. Additionally or alternatively, location management subsystem 115 may include one or more storage modules that enable system 100 to store information about its current location. Such information may, for instance, be determined using one or more location determination components included in location management subsystem 115. Additionally or alternatively, information related to the current location of system 100 may be determined during configuration of system 100.

For example, in some instances, a user may provide input specifying, during a configuration process, a particular location as being the current location of system 100, and location management subsystem 115 may store this location. In one or more arrangements, the location information stored by location management subsystem 115 may include various types of location information, including a street address corresponding to the location of system 100, geographic coordinates of the location of system 100, and/or error values associated with the location of system 100. Location management subsystem 115 also may store additional assistance information from which the location of system 100 may be determined, including an account number (e.g., associated with the service(s) being measured by metering subsystem 110) and/or a device identifier associated with system 100.

In some embodiments, communications subsystem 120 may enable system 100 to communicate electronically with one or more other devices. Communications subsystem 120 may include one or more wired and/or wireless interfaces via which system 100 may send and/or receive information. Examples of wired interfaces that may be included in communications subsystem 120 include one or more Ethernet interfaces, one or more power-line communications interfaces, one or more serial port interfaces, and/or other wired communications interfaces. Examples of wireless interfaces that may be included in communications subsystem 120 include one or more cellular communications interfaces (e.g., one or more CDMA interfaces, WCDMA interfaces, GSM interfaces, etc.), one or more WLAN interfaces (e.g., one or more IEEE 802.11 interfaces), and/or other wireless communications interfaces (e.g., Bluetooth, ZigBee, etc.).

In one or more arrangements, communications subsystem 120 may enable system 100 to communicate with one or more access points. For example, system 100 may use communications subsystem 120 to provide an access point with location assistance information. As noted above, this location assistance information may include information stored by location management subsystem 115. In addition, communications subsystem 120 may enable system 100 to report service usage information to one or more server computers, such as a central server computer at a utility company that is configured to collect such usage information for billing purposes.

Figure 2:
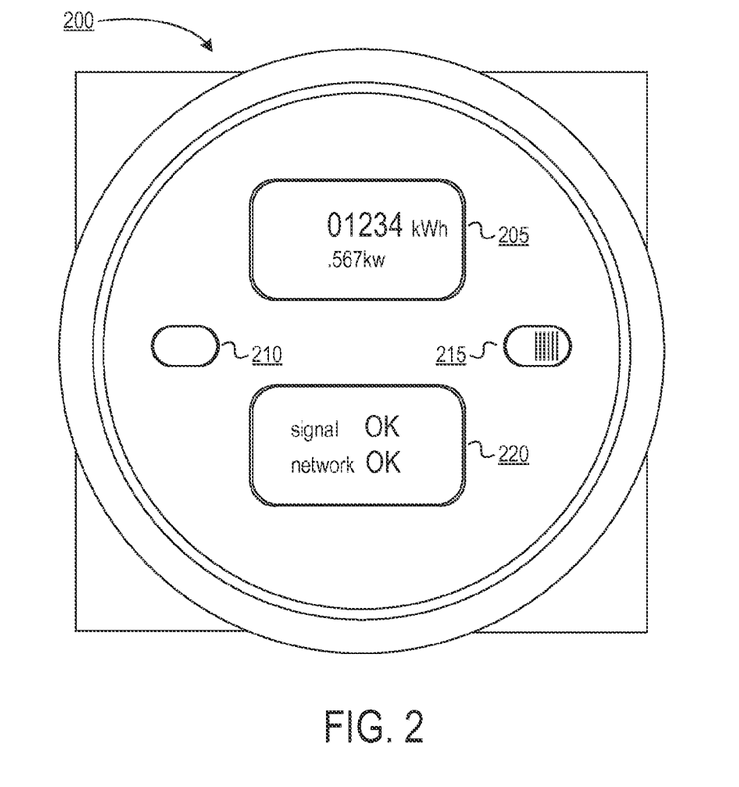
FIG. 2 illustrates an example of an exterior face of a smart meter according to some embodiments.

FIG. 2 illustrates an example of an exterior face of a smart meter 200 according to some embodiments. In particular, as seen in FIG. 2, smart meter 200 may include one or more display screens, such as display screens 205 and 220, as well as one or more other components, such as one or more data ports (e.g., data port 210) and/or one or more switches or buttons (e.g., button 215).

In one or more arrangements, a smart meter, such as smart meter 200, may be installed on an exterior wall of a house, building, or other premises, or in a cabinet or closet, for instance, and the one or more components of the smart meter may allow for various types of information to be exchanged with the smart meter. For example, a user may take a reading from smart meter 200 by pressing button 215, which may turn on and/or illuminate display screens 205 and 220 of smart meter 200, and these display screens may be configured to provide various types of information. For instance, display screen 205 may display usage information measured by smart meter 200, and display screen 220 may display network and/or signal status information detected by smart meter 200. As another example, data port 210 may enable smart meter 200 to receive configuration information, which may include information specifying a current location of smart meter 200, during a configuration process, for instance.

Figure 3:
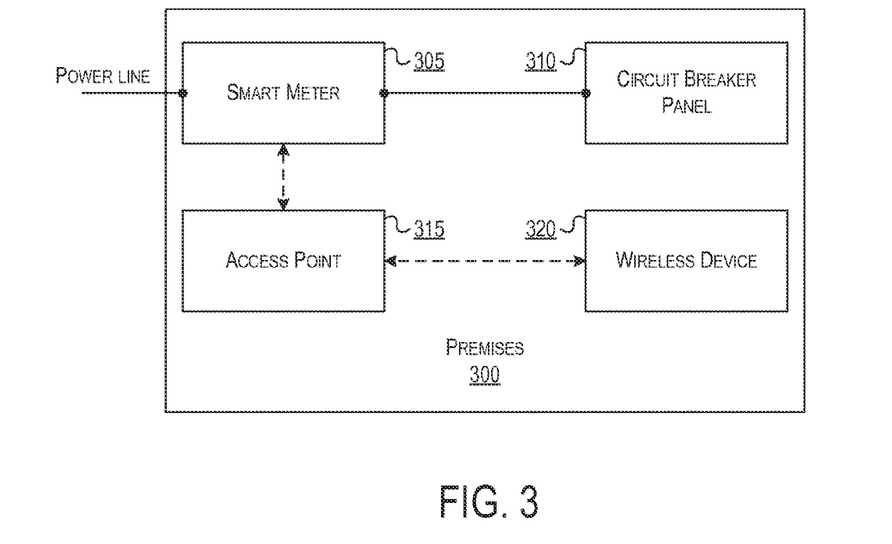
FIG. 3 illustrates an example operating environment of a smart meter according to some embodiments.

FIG. 3 illustrates an example operating environment of a smart meter according to some embodiments. In particular, as seen in FIG. 3, an example premises 300 may include a smart meter 305, one or more circuit breakers (e.g., circuit breaker panel 310), one or more access points (e.g., access point 315), and/or one or more wireless devices (e.g., wireless device 320).

In one or more arrangements, smart meter 305 may be physically connected to one or more utility lines, such as one or more electrical power lines, water lines, and/or gas lines, and smart meter 305 may be configured to measure consumption of one or more resources provided via such utility lines. For instance, in the example illustrated in FIG. 3, smart meter 300 is physically connected to a power line, and may be configured to measure the amount of electrical power consumed at premises 300 from the power line. In addition, a smart meter may physically connect one or more utility lines to one or more distribution points at the premises. For instance, in the example illustrated in FIG. 3, smart meter 300 physically connects the power line to circuit breaker 310, which may operate as a distribution point for electrical power at premises 300.

In some embodiments, a smart meter also may be communicatively coupled to an access point via one or more wired and/or wireless connections. For example, smart meter 305 may be communicatively coupled to access point 315, such that smart meter 305 and access point 315 can send data to, and receive data from, one another. In at least one embodiment, smart meter 305 may be wirelessly connected to access point 315 via a local wireless network connection provided by access point 315. For instance, access point 315 may be configured to provide a local wireless network at premises 300, and smart meter 305 may connect to the network and exchange data with access point 315, along with one or more other wireless devices on the network, such as wireless device 320.

In addition, as discussed in greater detail below, smart meter 305 may provide location assistance information to access point 315 and/or one or more devices connected to access point 315, such as wireless device 320. In particular, in some embodiments, a smart meter may provide information to an access point that enables the access point to provide location assistance information to one or more devices connected to the access point, where the location assistance information provides the location of the smart meter as an estimated current position of the access point. Since the one or more devices may, for instance, be connected to a local network provided by the access point, the estimated current position of the access point also may be considered an estimated current position of the one or more devices.

For example, smart meter 305 may send access point 315 a data message notifying access point 315 that access point 315 is located at a particular location, namely, the same location as smart meter 305. The data message sent by smart meter 305 may include, for instance, the predetermined and/or stored service address of smart meter 305, the account number associated with smart meter 305, geographic coordinates stored by smart meter 305, a device identifier assigned to smart meter 305, and/or one or more error codes provided by smart meter 305. Subsequently, access point 315 may provide location assistance information to one or more devices connected to a local network provided by access point 315, such as wireless device 320. This location assistance information may, for instance, identify the location of smart meter 305 as being an estimated position of access point 315. Thereafter, each of the one or more wireless devices, such as wireless device 320, may determine their current location as being the estimated position of access point 315.

In this example, although the position estimate may be somewhat rough in comparison to the accuracy of position determinations that can be made using GPS signals, for instance, this position estimate nevertheless can provide sufficient location accuracy for a number of uses and applications, such as determining the location of a computing device to enable location-based Internet content like local weather forecasts and targeted advertisements for local businesses. Moreover, if a more accurate position determination is required for a particular application, such as a navigation application or a land surveying application, for instance, then the position estimate based on the smart meter data can still be used in order to more quickly acquire GPS satellite signals to obtain a more accurate position determination (e.g., because such satellite signals can be acquired more quickly when a rough estimate of a device's current position is known).

In some embodiments, a smart meter may be communicatively coupled to an access point via one or more power-line communication connections. For example, smart meter 305 may be communicatively coupled to access point 315 via one or more power-line communication connections, instead of and/or in addition to the wired and/or wireless networking connections discussed above. In this example, smart meter 305 may send data to, receive data from, and/or otherwise exchange data with access point 315 by modulating one or more electrical signals onto a local power line (e.g., the power line that smart meter 305 connects to circuit breaker 310). In addition, smart meter 305 may provide similar location assistance information to access point 315 via the one or more power-line communication connections as may be provided via the one or more wired and/or wireless networking connections, as discussed in the examples above.

Figure 4:
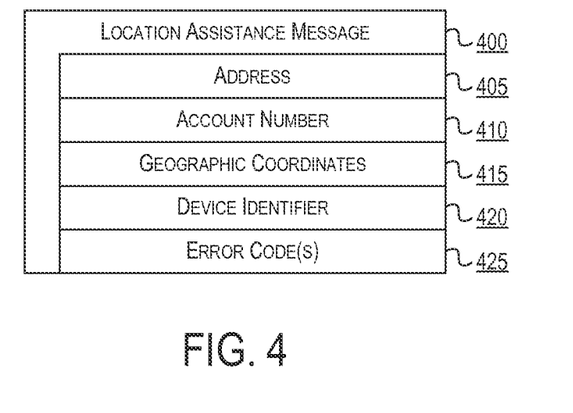
FIG. 4 illustrates an example of a location assistance message according to some embodiments.

FIG. 4 illustrates an example of a location assistance message 400 according to some embodiments. In some embodiments, a location assistance message may be sent as one or more data messages from a smart meter to an access point in order to provide the access point with information about the smart meter's current location. For example, a smart meter (e.g., smart meter 305 shown in FIG. 3) may send location assistance message 400 to an access point (e.g., access point 315 shown in FIG. 3), as this may enable the access point to provide location assistance information to one or more mobile devices (e.g., wireless device 320 shown in FIG. 3) based on location assistance message 400.

As seen in FIG. 4, location assistance message 400 may include one or more data fields in which different types of location assistance information may be stored. For example, location assistance message 400 may include address information 405, account number information 410, geographic coordinates information 415, device identifier information 420, and/or error information 425. While these types of location assistance information are discussed here as examples, a location assistance message may, in other embodiments, include additional or alternative fields instead of and/or in addition to those discussed here. For example, in some embodiments, a location assistance message, such as location assistance message 400, may include utility region information, which may specify a city block or other similar region in which a smart meter is located. Such utility region information may provide a more general sense of the location of the smart meter, and may be used instead of more specific information, such as address information 405, in cases where such address information is considered to be private, for instance. Like several of the other forms of information that may be included in location assistance message 400, utility region information may be used in determining the location of a smart meter (e.g., by comparing such utility region information with data stored by and/or provided by a utility company, so as to translate such utility region information into estimated geographic coordinates of the smart meter).

In one or more arrangements, the address information in a location assistance message may specify the street address of a premises at which the smart meter sending the location assistance message is installed. For example, address information 405 of location assistance message 400 may specify the street address of the premises at which the smart meter sending location assistance message 400 is installed.

Similarly, the account number information in a location assistance message may specify one or more account numbers associated with one or more service accounts to which one or more types of service usage measured by the smart meter are to be billed. For example, account number information 410 of location assistance message 400 may specify one or more account numbers associated with one or more service accounts to which one or more types of service usage measured by the smart meter sending location assistance message 400 are to be billed.

In at least one arrangement, the geographic coordinates information in a location assistance message may, for instance, specify the geographic coordinates, such as the latitude, longitude, and/or altitude, of the premises at which the smart meter sending the location assistance message is installed. For example, geographic coordinates information 415 of location assistance message 400 may specify the latitude, longitude, and/or altitude of the premises at which the smart meter sending location assistance message 400 is installed.

In at least one arrangement, the device identifier information in a location assistance message may specify a unique identifier, such as a serial number, assigned to the smart meter sending the location assistance message. For example, device identifier information 420 of location assistance message 400 may specify a unique identifier assigned to the smart meter sending location assistance message 400.

In one or more arrangements, the error information in a location assistance message (e.g., error information 425 of location assistance message 400) may specify an error factor corresponding to an estimate of the amount of location error that may arise in using the location of the smart meter as an estimated position for an access point receiving the location assistance message. In at least one arrangement, the error factor may be based on the size of the premises at which the smart meter is installed. For instance, the larger the size of the premises at which the smart meter is installed, the greater the error factor in the location assistance message may be, since the area of the premises also represents the area in which an access point (e.g., the access point receiving the location assistance message) can possibly be located. For example, a smart meter and/or an access point may be located along one side of a premises, but the actual address of the premises, which may be used in determining location, as discussed above, may be considered to be along another side of the premises. In some arrangements, the error factor may be equal to the size of the premises (e.g., in units of area, such as square-feet or square-meters).

In one or more additional and/or alternative arrangements, the error factor also may account for the distance that a signal transmitted by a smart meter may travel in reaching one or more access points. For example, there may be instances in which an access point is not located at a particular premises, but is within range of a signal transmitted by a smart meter located at the particular premises. In these instances, the access point may erroneously determine that its location is the location of the smart meter, when it is in fact located elsewhere. By having the error factor account for the distance that the signal of the smart meter may travel, an access point receiving the signal at a different, yet nearby premises may be able to determine and/or otherwise obtain a better understanding of its location.

In some arrangements, the error factor specified in the location assistance message may be configured to be a conservative estimate of the amount of location error that may arise in using the location of the smart meter as an estimated position for an access point receiving the location assistance message. For example, when determining the error factor, a user configuring the smart meter and/or the smart meter itself (e.g., using one or more algorithms) may err towards determining the error factor to be larger, rather than smaller. While this may, in some instances, result in larger uncertainty about location assistance information derived from a location assistance message, it also may mitigate and/or avoid situations in which an access point or other device relies on and/or otherwise uses potentially erroneous location assistance information.

Figure 5:
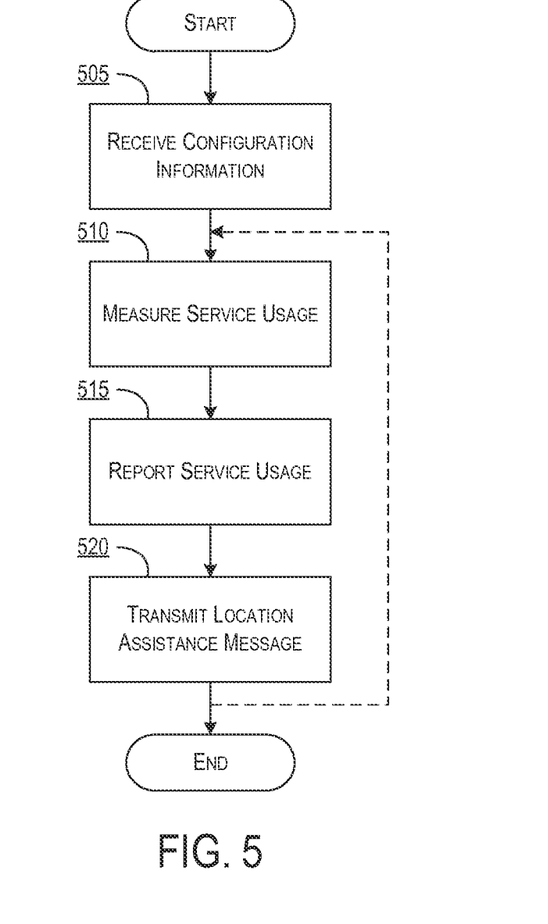
FIG. 5 illustrates an example method of providing location assistance information to an access point according to some embodiments.

FIG. 5 illustrates an example method of providing location assistance information to an access point according to some embodiments. The processing illustrated in FIG. 5 may be implemented in software (e.g., computer-readable instructions, code, programs, etc.) that can be executed by one or more processors and/or other hardware components. Additionally or alternatively, the software may be stored on a non-transitory computer-readable storage medium.

As seen in FIG. 5, the method may be initiated in step 505, in which configuration information may be received. In some embodiments, configuration information may be received by system 100 of FIG. 1, for example, which may be incorporated into a smart meter. In addition, the configuration information may be received via input/output subsystem 105 of system 100 and/or may include information identifying a current location of system 100. For example, the configuration information may include a street address at which system 100 is installed and/or geographic coordinates of the location at which system 100 is installed. Further, the configuration information may include any and/or all of the information that can be included in a location assistance message, as illustrated in FIG. 4 and discussed above with respect to location assistance message 400. For instance, the configuration information received in step 505 may include one or more account numbers with respect to which system 100 may be configured to report service usage, a device identifier assigned to system 100, and/or error information associated with the size of the premises at which system 100 may be installed. As noted above, system 100 may store any and/or all of this configuration information in one or more subsystems of system 100, such as location management subsystem 115.

In step 510, service usage may be measured. For example, system 100 may measure service usage using metering subsystem 110. This may include, for instance, measuring an amount of electric power consumed at the premises at which system 100 is installed, measuring an amount of water consumed at the premises at which system 100 is installed, and/or measuring an amount of gas consumed at the premises at which system 100 is installed. In addition to measuring this service usage information, metering subsystem 110 of system 100 also may store such measurements to facilitate reporting the usage to the appropriate utility company (or companies) for billing purposes, for instance.

Subsequently, in step 515, the measured service usage may be reported. For example, system 100 may report the service usage measured in step 510 to one or more utility companies that provide the services consumed at the premises. To report the service usage, system 100 may, for instance, use communications subsystem 120 to send information describing the service usage to one or more server computers operated by one or more utility companies. In sending this information, communications subsystem 120 of system 100 may connect to and/or communicate via an access point located at the premises at which system 100 is installed. The access point may, for instance, route the information describing the service usage to the one or more server computers. In addition, and as discussed below, system 100 may provide location assistance information to the access point.

In particular, in step 520, a location assistance message may be sent. For example, system 100 may send a location assistance message to an access point located at the premises at which system 100 is installed. In some instances, this access point may have been used by system 100 in reporting service usage in step 515, for example.

In some embodiments, sending a location assistance message to an access point may include sending a location assistance message that resembles location assistance message 400, which was discussed above with respect to FIG. 4. For example, in step 520 of the example method illustrated in FIG. 5, system 100 may send location assistance message 400 to an access point located at the premises at which system 100 is installed. As discussed above, this location assistance message may enable the access point to determine its location and/or provide location assistance information to one or more other computing devices that are connected to the access point.

Subsequently, the method may return to step 510, and system 100 may continue to measure service usage information. In some embodiments, system 100 may repeat execution of steps 515 and/or 520. This may, for instance, include retransmitting a location assistance message periodically. For example, a schedule for transmitting the location assistance message may be defined and stored by system 100 (e.g., by location management subsystem 115 of system 100) during configuration. System 100 then may retransmit the location assistance message in accordance with this schedule. In some instances, such a schedule may specify that a location assistance message is to be sent hourly or daily, while in other instances, the schedule may specify that a location assistance message is to be sent semi-weekly or weekly. Because a smart meter may be installed at a particular location without changing position for a relatively long period of time (e.g., on the order of years), it might not be necessary for the smart meter to send hourly or even daily updates as to its location. In some instances, however, this more frequent schedule (e.g., relative to a semi-weekly or weekly updating schedule) may be desirable, as the access point(s) installed at a premises may be reinstalled, reinitialized, and/or replaced on a more frequent basis.

As seen in steps 515 and 520 of the example method illustrated in FIG. 5, the information describing the service usage may be sent separately from the location assistance message. In other words, the location assistance message sent by a smart meter (e.g., location assistance message 400 sent by system 100) may be stored and/or transmitted in one or more communications that do not include service usage information, and the service usage information sent by a smart meter may be stored and/or transmitted in one or more communications that do not include location assistance information and/or a location assistance message. By separating a location assistance message from measured service usage information in this manner, a smart meter capable of providing location assistance information to an access point may maintain backward-compatibility with access points that might not be capable of receiving and/or processing such location assistance information.

Figure 6:
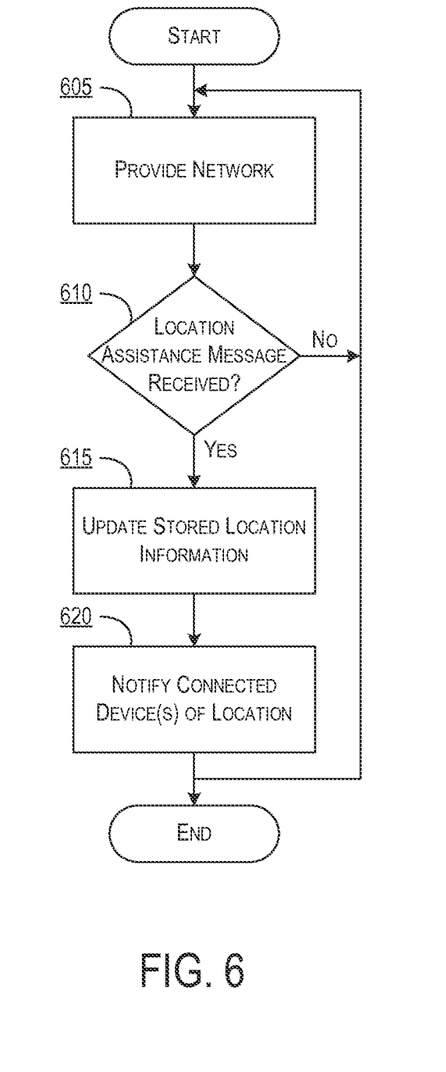
FIG. 6 illustrates an example method of providing location assistance information to a device connected to an access point according to some embodiments.

FIG. 6 illustrates an example method of providing location assistance information to a device connected to an access point according to some embodiments. As discussed above, a smart meter may, in some embodiments, provide location assistance information to an access point, so as to enable the access point to provide location assistance information to one or more other devices connected to the access point. An overview of the processing that may be performed by such an access point will now be discussed with reference to FIG. 6.

As seen in FIG. 6, the method may be initiated in step 605, in which an access point located at a premises may provide a network to which one or more devices can connect. The network may be a wired network, a wireless network, or a combination thereof. In some embodiments, a smart meter at the premises may connect to the network provided by the access point, along with one or more other computing devices. An example of this arrangement is shown in FIG. 3, in which smart meter 305 is connected to the network provided by access point 315, and wireless device 320 is likewise connected to the network provided by access point 315.

Referring again to FIG. 6, in step 610, it may be determined whether a location assistance message has been received. For example, in step 610, the access point (e.g., access point 315) may determine whether it has received a location assistance message from a smart meter (e.g., smart meter 305).

If the access point determines that a location assistance message has not been received, then the method may return to step 605 in which the access point may continue to provide the network. On the other hand, if the access point determines that a location assistance message has been received, then in step 615, the access point may update location information stored at the access point based on the contents of the location assistance message.

For example, if access point 315 receives a location assistance message (e.g., location assistance message 400 of FIG. 4) from smart meter 305, then access point 315 may create and/or update one or more data records in which access point 315 stores location information. These data records may include fields corresponding to the fields of location assistance message 400, such as an address information field, an account number information field, a geographic coordinates information field, a device identifier information field, and/or an error information field. Additionally or alternatively, these data records may enable access point 315 to estimate its own position (e.g., by determining that it, namely, access point 315, is approximately positioned at the same location as smart meter 305).

Subsequently, in step 620, the access point may notify one or more connected devices of the estimated position of the access point and/or otherwise provide location assistance information to these devices based on the location assistance message received in step 610. For example, in step 620, access point 315 may notify wireless device 320 that a location assistance message has been received from smart meter 305. Additionally or alternatively, access point 315 may, in step 620, notify wireless device 320 that access point 315 is located at a particular, estimated location (e.g., determined by access point 315 based on the location assistance message received in step 610), and/or may notify wireless device 320 that wireless device 320 is located at the particular, estimated location.

In some embodiments, an access point may be configured to use location assistance information obtained from a smart meter in one or more additional and/or alternative ways. For example, in some embodiments, an access point may be configured such that once the access point has estimated its own position (e.g., by determining that it, namely, access point 315, is approximately positioned at the same location as smart meter 305), the access point may collect measurements about other wireless signals observable at its position. The access point then may provide these measurements to a server that collects "crowd-sourced" location-specific signal measurements from a number of devices that can then be used in assisting other devices in determining their position.

For example, an access point (e.g., access point 315) may be configured to measure parameters of signals received from other access points, and such parameters may include received signal strength indication (RSSI), round-trip time (RTT), and/or other signal properties. The access point may further configured to send these signal measurements to a server and/or cloud database, which may be configured to gather information about observable signals in a number of locations and provide location assistance to wireless devices (e.g., wireless device 320) that may be in unknown locations, but are able to receive one or more wireless signals. Based on the signals received by a particular wireless device in an otherwise unknown location, such as signals received from one or more access points, the wireless device may be able to determine its current location by comparing properties of the received signal(s), such as the RSSI, RTT, and/or other properties or signal identifiers, with information stored in the server and/or cloud database identifying the one or more signals that are observable at particular locations.

In some embodiments, an access point may receive location assistance information and/or location assistance messages from a plurality of smart meters located at a number of different premises. In these embodiments, the access point may consolidate location assistance information and/or location assistance messages from such a plurality of smart meters in order to determine a single location to be used as the determined location of the access point. In order to perform this consolidation, the access point may execute one or more algorithms that determine the location of the access point based on one or more properties of the signals received from the plurality of smart meters, such as the respective signal strength of the received signals. For instance, one particular signal from a particular smart meter may have a stronger signal strength than other signals from other smart meters, which may be used by the access point to determine that the access point is located closest to the particular smart meter which sent the particular signal.

Figure 7:
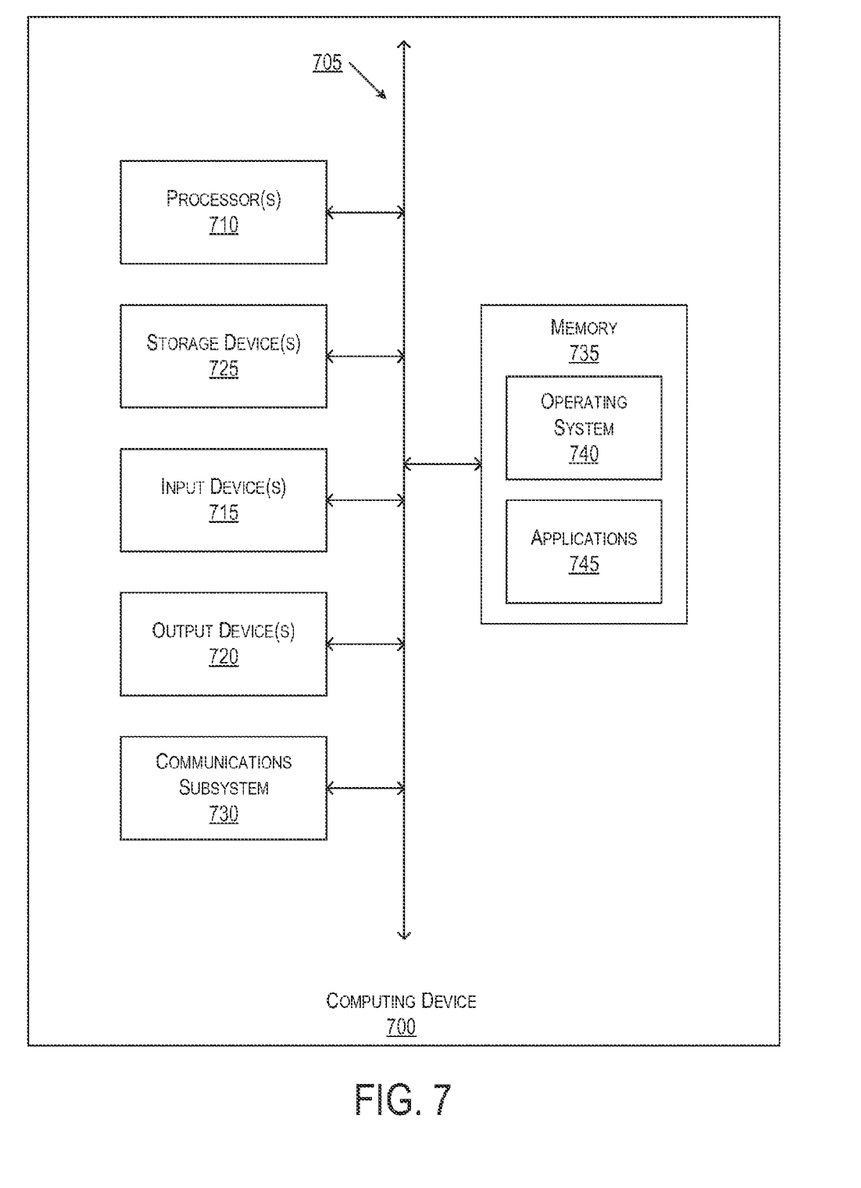
FIG. 7 illustrates an example of a computer system in which one or more embodiments may be implemented.

According to one or more aspects, a computer system as illustrated in FIG. 7 may be incorporated as part of a computing device, which may implement, perform, and/or execute any and/or all of the features, methods, and/or method steps described herein. For example, computer system 700 may represent some of the components of a smart meter, an access point, or a computing device, such as a laptop computer, a tablet computer, a smart phone, a video-game console, or a desktop computer. In addition, computer system 700 may represent some of the components of system 100 of FIG. 1. FIG. 7 provides a schematic illustration of one embodiment of a computer system 700 that can perform the methods provided by various other embodiments, as described herein. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a camera, a mouse, a keyboard and/or the like; and one or more output devices 720, which can include without limitation a display unit, a printer and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 5 and 6, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example one or more steps of the methods described with respect to FIGS. 5 and 6.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method, comprising:
    transmitting, by a smart meter configured to measure service usage at a premises, at least one data message to at least one wireless access point located at the premises, the at least one data message including information identifying a location of the smart meter,
    wherein the at least one data message is configured to cause the at least one wireless access point to provide, to at least one mobile device connected to the at least one wireless access point, the location of the smart meter as an estimated position of the at least one wireless access point.

2. The method of claim 1, wherein the information identifying the location of the smart meter includes an address of the premises.

3. The method of claim 1, wherein the information identifying the location of the smart meter includes an account number associated with the measured service usage.

4. The method of claim 1, wherein the information identifying the location of the smart meter includes geographic coordinates of the premises.

5. The method of claim 1, wherein the at least one data message further includes an error factor specifying an amount of position error based on a size of the premises.

6. The method of claim 1, further comprising:
    retransmitting, by the smart meter, the at least one data message based on a predefined schedule.

7. The method of claim 1, wherein the at least one data message is transmitted separately from metering information specifying the measured service usage.

8. The method of claim 1, wherein the smart meter transmits the at least one data message to the at least one wireless access point via a wireless connection.

9. The method of claim 1, wherein the smart meter transmits the at least one data message to the at least one wireless access point via a power-line communication connection.

10. A smart meter comprising:
    one or more processors; and
    memory storing computer-readable instructions that, when executed by the one or more processors, cause the smart meter to:
        measure service usage at a premises; and
        transmit at least one data message to at least one wireless access point located at the premises, the at least one data message including information identifying a location of the smart meter,
    wherein the at least one data message is configured to cause the at least one wireless access point to provide, to at least one mobile device connected to the at least one wireless access point, the location of the smart meter as an estimated position of the at least one wireless access point.

11. The smart meter of claim 10, wherein the information identifying the location of the smart meter includes an address of the premises.

12. The smart meter of claim 10, wherein the information identifying the location of the smart meter includes an account number associated with the measured service usage.

13. The smart meter of claim 10, wherein the information identifying the location of the smart meter includes geographic coordinates of the premises.

14. The smart meter of claim 10, wherein the at least one data message further includes an error factor specifying an amount of position error based on a size of the premises.

15. The smart meter of claim 10, wherein the memory stores additional computer-readable instructions that, when executed by the one or more processors, further cause the smart meter to:

retransmit the at least one data message based on a predefined schedule.

16. The smart meter of claim 10, wherein the at least one data message is transmitted separately from metering information specifying the measured service usage.

17. One or more computer-readable media storing computer-executable instructions that, when executed, cause one or more computing devices to:

transmit, from a smart meter configured to measure service usage at a premises, at least one data message to at least one wireless access point located at the premises, the at least one data message including information identifying a location of the smart meter, wherein the at least one data message is configured to cause the at least one wireless access point to provide, to at least one mobile device connected to the at least one wireless access point, the location of the smart meter as an estimated position of the at least one wireless access point.

18. The one or more computer-readable media of claim 17, wherein the information identifying the location of the smart meter includes an address of the premises.

19. The one or more computer-readable media of claim 17, wherein the information identifying the location of the smart meter includes an account number associated with the measured service usage.

20. The one or more computer-readable media of claim 17, wherein the information identifying the location of the smart meter includes geographic coordinates of the premises.

21. The one or more computer-readable media of claim 17, wherein the at least one data message further includes an error factor specifying an amount of position error based on a size of the premises.

22. The one or more computer-readable media of claim 17, having additional computer-executable instructions stored thereon that, when executed, further cause the one or more computing devices to:

retransmit, from the smart meter, the at least one data message based on a predefined schedule.

23. The one or more computer-readable media of claim 17, wherein the at least one data message is transmitted separately from metering information specifying the measured service usage.

* * * * *